US011019004B1

(12) United States Patent
Sohrweide et al.

(10) Patent No.: US 11,019,004 B1
(45) Date of Patent: May 25, 2021

(54) SYSTEM, METHOD, AND COMPUTER PROGRAM FOR PERFORMING BOT ENGINE ABSTRACTION

(71) Applicant: Amdocs Development Limited, Limassol (CY)

(72) Inventors: Deborah A. Sohrweide, San Jose, CA (US); Sanjay Gupta, Pune (IN); Andrew Harper, Roswell, GA (US); Alma D. Lopez, San Jose, CA (US); Ksheerasagar Akella, Sunnyvale, CA (US); Roi Dayan, Sunnyvale, CA (US); Toshish Arun Jawale, San Jose, CA (US); Pawan Liladhar Bhole, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 814 days.

(21) Appl. No.: 15/862,534

(22) Filed: Jan. 4, 2018

(51) Int. Cl.
*G06N 20/00* (2019.01)
*H04L 12/58* (2006.01)
*G06N 3/00* (2006.01)
*G06F 16/335* (2019.01)

(52) U.S. Cl.
CPC .......... *H04L 51/046* (2013.01); *G06N 3/004* (2013.01); *G06N 20/00* (2019.01); *H04L 51/02* (2013.01); *G06F 16/337* (2019.01)

(58) Field of Classification Search
CPC ...... G06F 3/0481; G06F 3/482; G06F 16/248; G06F 16/3329; G06F 16/337; G06F 40/247; G06F 40/30; G06F 3/011; G06F 3/0482; G06F 3/167; G06F 9/453; G06F 9/541; G06F 40/166; G06F 40/253; G06F 40/56; G06N 3/004; G06N 20/00; G06N 5/025; G06N 5/04; G06N 20/20; G06Q 30/04; G06Q 30/0625; G06Q 50/01; G06Q 10/063116; G06Q 10/105; G06Q 30/0215; G10L 15/30; G10L 17/22; G10L 15/1822; H04L 43/0817; H04L 51/02; H04L 51/046; H04L 67/14; H04L 9/065; H04L 41/147; H04L 67/141; H04L 67/146; H04L 67/303
USPC ....... 704/270.1; 705/14.54, 319; 706/11, 20; 709/206; 348/77; 370/252; 379/88.01, 379/265.09, 265.12; 382/118; 455/412.1, 455/556.1; 707/740; 715/752, 753
See application file for complete search history.

(56) References Cited

U.S. PATENT DOCUMENTS 6,795,808 B1  9/2004  Strubbe et al.
8,296,380 B1 * 10/2012  Kelly .................. G06Q 10/107
                                                    709/206
8,396,205 B1 *  3/2013  Lowry ................ H04M 3/5175
                                                    379/265.12

(Continued)

FOREIGN PATENT DOCUMENTS

WO       0209399 A2    1/2002

*Primary Examiner* — Gerald Gauthier
(74) *Attorney, Agent, or Firm* — Zilka-Kotab, P.C.

(57) ABSTRACT

A system, method, and computer program product are provided for performing bot engine abstraction. In use, a message is received at a bot engine from a messaging channel, utilizing a first abstraction layer. Additionally, one or more external components are accessed by the bot engine, utilizing a second abstraction layer, to create a response to the message. Further, the response is sent from the bot engine to the messaging channel, utilizing the first abstraction layer.

19 Claims, 4 Drawing Sheets

(56) References Cited

U.S. PATENT DOCUMENTS

| | | | | |
|---|---|---|---|---|
| 8,630,961 B2* | 1/2014 | Beilby | | G06N 3/004 |
| | | | | 706/11 |
| 9,043,407 B1* | 5/2015 | Gaulke | | H04L 51/02 |
| | | | | 709/206 |
| 9,369,410 B2 | 6/2016 | Capper et al. | | |
| 9,847,084 B2* | 12/2017 | Gustafson | | G06F 3/167 |
| 10,366,168 B2* | 7/2019 | Wu | | G06F 40/56 |
| 10,388,285 B2* | 8/2019 | Hirzel | | G06F 8/30 |
| 10,742,572 B2* | 8/2020 | Anderson | | H04L 51/02 |
| 10,777,201 B2* | 9/2020 | Trufinescu | | G06F 3/167 |
| 2005/0015350 A1* | 1/2005 | Foderaro | | G06N 3/004 |
| | | | | 706/20 |
| 2006/0155765 A1* | 7/2006 | Takeuchi | | G06F 16/3329 |
| 2008/0288349 A1* | 11/2008 | Weisberg | | G06F 16/957 |
| | | | | 705/14.54 |
| 2009/0281966 A1* | 11/2009 | Biggs | | G06F 16/951 |
| | | | | 706/11 |
| 2013/0129058 A1* | 5/2013 | Kelly | | G06Q 30/01 |
| | | | | 379/88.01 |
| 2013/0129075 A1* | 5/2013 | Whitaker | | H04M 3/523 |
| | | | | 379/265.09 |
| 2013/0176413 A1* | 7/2013 | Lowry | | H04M 3/5175 |
| | | | | 348/77 |
| 2013/0336137 A1* | 12/2013 | Cohen | | H04L 43/04 |
| | | | | 370/252 |
| 2014/0006408 A1* | 1/2014 | Rae | | G06F 40/295 |
| | | | | 707/740 |
| 2014/0079297 A1* | 3/2014 | Tadayon | | G06K 9/00288 |
| | | | | 382/118 |
| 2014/0279050 A1 | 9/2014 | Makar et al. | | |
| 2015/0052456 A1* | 2/2015 | Engelking | | H04L 51/32 |
| | | | | 715/753 |
| 2015/0066788 A1* | 3/2015 | Tebbe | | G06Q 50/01 |
| | | | | 705/319 |
| 2015/0082191 A1* | 3/2015 | Dietz | | H04L 51/063 |
| | | | | 715/752 |
| 2015/0256666 A1* | 9/2015 | Peterson | | H04W 4/14 |
| | | | | 455/412.1 |
| 2016/0105292 A1* | 4/2016 | Choi | | H04L 51/02 |
| | | | | 709/206 |
| 2016/0119463 A1* | 4/2016 | Tan | | H04W 88/02 |
| | | | | 455/556.1 |
| 2016/0149839 A1* | 5/2016 | Yi | | H04L 67/1095 |
| | | | | 709/206 |
| 2016/0216947 A1* | 7/2016 | Hassibi | | G06F 3/04842 |
| 2016/0225044 A1* | 8/2016 | Lawson | | H04M 15/8228 |
| 2016/0323394 A1 | 11/2016 | Luo et al. | | |
| 2017/0243028 A1* | 8/2017 | LaFever | | G06F 21/6263 |
| 2017/0250930 A1* | 8/2017 | Ben-Itzhak | | G06F 3/011 |
| 2017/0287090 A1* | 10/2017 | Hunn | | G06Q 50/18 |
| 2017/0345079 A1* | 11/2017 | Rangan | | G06Q 30/0633 |
| 2018/0053100 A1* | 2/2018 | Appel | | G06N 5/022 |
| 2018/0102988 A1* | 4/2018 | Ray | | H04L 43/06 |
| 2018/0219921 A1* | 8/2018 | Baer | | H04L 65/1069 |
| 2018/0248818 A1* | 8/2018 | Zucker | | G06N 3/004 |
| 2018/0255006 A1* | 9/2018 | Kamat | | G06F 40/35 |
| 2018/0285859 A1* | 10/2018 | Jiang | | G06Q 30/0215 |
| 2018/0287957 A1* | 10/2018 | Lam He | | G06N 20/00 |
| 2018/0301141 A1* | 10/2018 | Altaf | | G06F 40/20 |
| 2018/0307464 A1* | 10/2018 | Bijani | | G06F 8/36 |
| 2018/0316634 A1* | 11/2018 | Driscoll | | G06F 9/541 |
| 2018/0331980 A1* | 11/2018 | Jernstrom | | H04L 51/02 |
| 2018/0357310 A1* | 12/2018 | Eidem | | H04L 63/0823 |
| 2018/0359198 A1* | 12/2018 | Eidem | | H04L 67/306 |
| 2018/0367480 A1* | 12/2018 | Housman | | G06F 40/216 |
| 2019/0005021 A1* | 1/2019 | Miller | | G10L 15/26 |
| 2019/0005024 A1* | 1/2019 | Somech | | H04L 51/36 |
| 2019/0012390 A1* | 1/2019 | Nishant | | G06F 16/248 |
| 2019/0034814 A1* | 1/2019 | Amer | | G06N 5/04 |
| 2019/0066694 A1* | 2/2019 | Hirzel | | G10L 17/22 |
| 2019/0068526 A1* | 2/2019 | Xie | | H04L 67/20 |
| 2019/0103111 A1* | 4/2019 | Tiwari | | G06F 16/3334 |
| 2019/0132264 A1* | 5/2019 | Jafar Ali | | G06F 40/30 |
| 2019/0205837 A1* | 7/2019 | Tuli | | G06Q 10/105 |
| 2019/0215283 A1* | 7/2019 | Nahum | | G06F 9/542 |

* cited by examiner

SYSTEM, METHOD, AND COMPUTER PROGRAM FOR PERFORMING BOT ENGINE ABSTRACTION

FIELD OF THE INVENTION

The present invention relates to data abstraction, and more particularly to implementing a bot engine within an abstract framework.

BACKGROUND

Chat bots are a common tool used to meet many customer service needs. However, current chat bots are fixed in nature. For example, current chat bots may only understand a single language, may only communicate via a single communication channel, etc. In another example, current chat bots may need to be manually connected to external components used by the chat bot, utilizing proprietary communications information of the external components. This may limit a flexibility of current chat bots.

There is thus a need for addressing these and/or other issues associated with the prior art.

SUMMARY

A system, method, and computer program product are provided for performing bot engine abstraction. In use, a message is received at a bot engine from a messaging channel, utilizing a first abstraction layer. Additionally, one or more external components are accessed by the bot engine, utilizing a second abstraction layer, to create a response to the message. Further, the response is sent from the bot engine to the messaging channel, utilizing the first abstraction layer.

In a first embodiment, the first abstraction layer may intercept the message before it is received at the bot engine. Additionally, the first abstraction layer may identify the messaging channel from which the message is received. Further, the first abstraction layer may convert the message from a platform-specific message to a generic message. Further still, the first abstraction layer may send a converted message to the bot engine. Also, the interception and conversion may be transparent to the bot engine.

In a second embodiment (which may or may not be combined with the first embodiment), the external components may include one or more analytics services, including an analytics engine that compares one or more portions of the message to historical data in order to determine how to create the response to the message to create optimal results, where the determination is then returned to the bot engine.

In a third embodiment (which may or may not be combined with the first and/or second embodiment), the external components may include one or more translation services, including an engine that translates text or audio of the message to a different language that is then returned to the bot engine.

DETAILED DESCRIPTION

Figure 1:
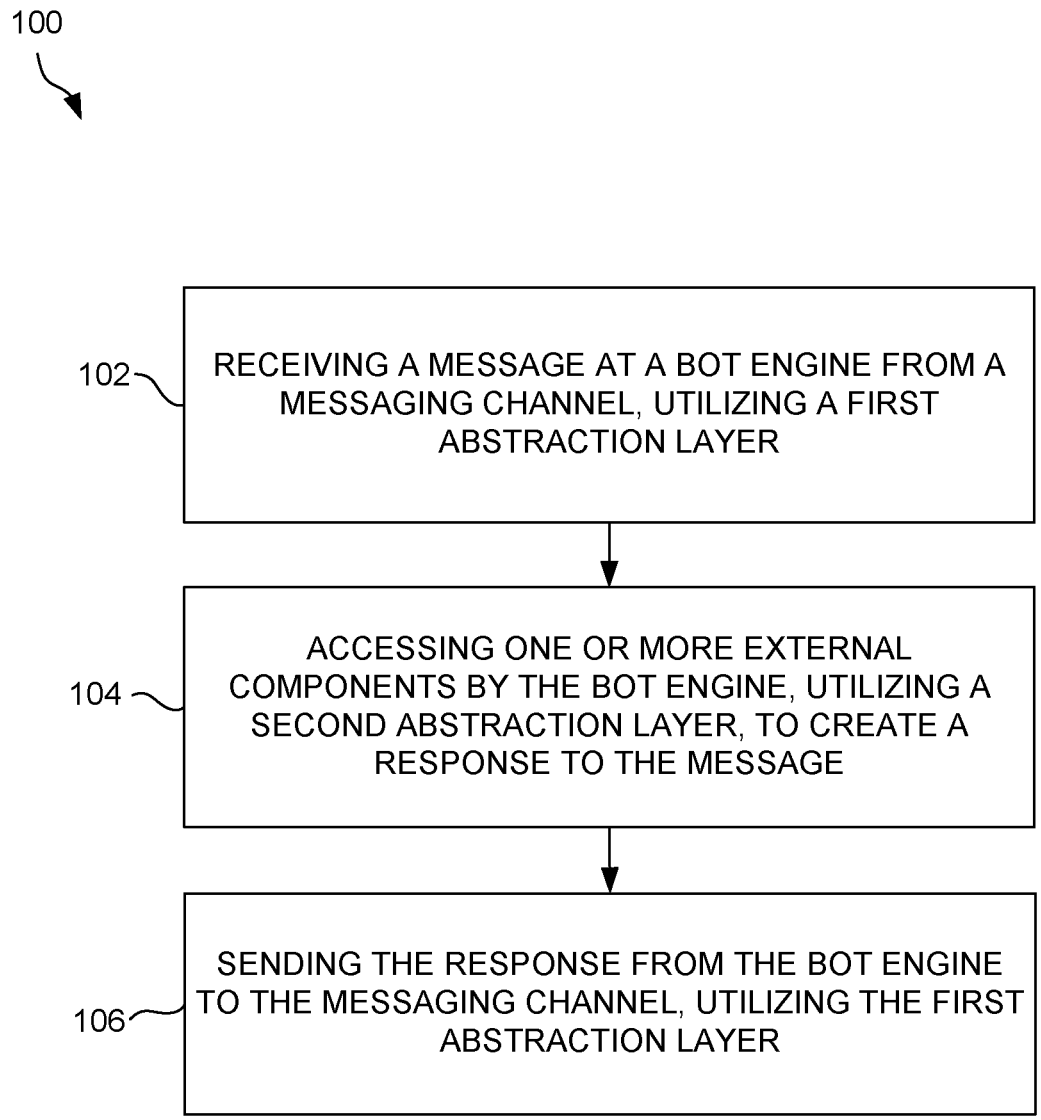
FIG. 1 illustrates a method for performing bot engine abstraction, in accordance with one embodiment.

FIG. 1 illustrates a method 100 for performing bot engine abstraction, in accordance with one embodiment. As shown, a message is received at a bot engine from a messaging channel, utilizing a first abstraction layer. See operation 102. In one embodiment, the bot engine may include a chat bot. For example, the bot engine may include an application that provides chat response services to one or more customers. In another example, the chat bot may receive the message (e.g., as part of a current chat session, etc.) and may generate a response to the message.

Additionally, in one embodiment, the message may include a portion of a conversation (e.g., a chat, etc.). In another embodiment, the message may include one or more of text, images, video, audio, etc. In yet another embodiment, the message may have one or more associated characteristics. For example, the associated characteristics may include one or more of a user ID of the customer sending the message, an ID of a messaging channel that sent the message, a location of the user, a time and/or date that the message was sent, etc.

Further, in one embodiment, the messaging channel may include one or more customer-initiated services. For example, the messaging channel may include a social media website or application, a communications website or application, etc. In another example, the messaging channel may provide chat functionality enabling a customer to send a message to the bot engine. For instance, the chat functionality may be provided as a user interface (UI), chat window, link (e.g., a URL, etc.), etc. In another embodiment, the message may be sent to the bot engine in response to a selection by the customer. For example, the customer may enter text or other media into a provided chat window (e.g., a chat widget, etc.) and select a send option.

Further still, in one embodiment, the first abstraction layer may include a communications abstraction layer that enables a plurality of different messaging channels to send messages to the bot engine. For example, the first abstraction layer may intercept the message before it is received at the bot engine. The first abstraction layer may then identify the messaging channel from which the message is received. The first abstraction layer may then convert the message from a platform-specific message to a generic message. The first abstraction layer may then send the converted message to the bot engine. In another embodiment, the interception and conversion may be transparent to the bot engine.

Also, one or more external components are accessed by the bot engine, utilizing a second abstraction layer, to create a response to the message. See operation 104. In one embodiment, specific external components may be accessed based on one or more associated characteristics of the message. For example, the external components accessed may be based on the messaging channel, customer ID, location, time, etc.

In addition, in one embodiment, only external components linked to a customer (e.g., the customer who sent the message) may be accessed. In another embodiment, the external components may include one or more third party services.

For example, the external components may include one or more language understanding services, such as an artificial intelligence (AI) engine that analyzes the received message to determine and return one or more of sentiment, personality, language, intent of the customer sending the message, etc. In another example, the external components may include one or more translation services, such as an engine that translates text or audio of the received message to a different language that is then returned.

Furthermore, in one example, the external components may include one or more analytics services, such as an analytics engine that compares one or more portions of the received message to historical data in order to determine how to create the response to the message to create optimal results, where the determination is then returned. In another example, the external components may include one or more business services components, such as a business services engine that accesses one or more business microservices in order to determine how to create the response to the message according to one or more predetermined business plans, where the determination is then returned. The one or more business services components may also include business process automation that performs one or more actions automatically in response to being triggered by receiving predetermined message data. In another embodiment, the one or more actions may be customized (e.g., by one or more users, etc.).

In one embodiment, the business microservices may include a service relating to one or more of customer management, product catalog, ordering, billing and/or payment, mapping and/or serviceability. Additionally, the external components may include business knowledge, ability to interpret and understanding language (including context-awareness, etc.), and/or analytics/decision making capabilities.

Further still, in one example, the external components may include one or more chat storage components, such as a data storage service that stores and aggregates historical messages for analysis. The one or more chat storage components may include a chat session database that stores message data in order to provide failover, persistence, and statelessness services in real-time.

Also, in one embodiment, the external components may include one or more conversation flow control services, which may modify the flow of conversation of the bot engine. In one embodiment, the flow may be customized (e.g., by one or more users, etc.). In another embodiment, the external components may include one or more cloud-based services.

Additionally, in one embodiment, accessing the one or more external components may include sending all or part of the message to the one or more external components. In another embodiment, accessing the one or more external components may include sending one or more of the associated characteristics of the message to the one or more external components. In yet another embodiment, accessing the one or more external components may include receiving information from the one or more external components. For example, the information may include all or part of the response, suggestions for the response, data to be used by the bot engine when determining the response, etc.

Further, in one embodiment, creating the response to the message may include analyzing, by the bot engine, the message as well as the information received from the one or more external components. For example, all or a portion of the message may be generated by the bot engine, based on the analyzing.

Further still, in one embodiment, the second abstraction layer may utilize bootstrapping to access the one or more external components. For example, a bootstrap module may create a bot framework that is compatible with each of the one or more external components. In another example, bootstrap code may utilize a predetermined configuration to perform an abstraction of communications sent to and from the one or more external components. For instance, a predetermined configuration may be selected based on one or more associated characteristics of the message. In another embodiment, the second abstraction layer may utilize one or more application programming interfaces (APIs) to access the one or more external components.

Also, the response is sent from the bot engine to the messaging channel, utilizing the first abstraction layer. See operation 106. For example, a generic message may be sent from the bot engine. In another example, the first abstraction layer may intercept the generic message before it is sent to the messaging channel. In yet another example, the first abstraction layer may identify the messaging channel for which the message is intended. In still another example, the first abstraction layer may convert the message from a generic message to a platform-specific message, based on the intended messaging channel. In another example, the first abstraction layer may send the converted message to the intended messaging channel.

In addition, in one embodiment, a second message may be received at the bot engine from a second messaging channel that is different from the initial messaging channel, utilizing the first abstraction layer. For example, the first abstraction layer may intercept the second message before it is received at the bot engine. The first abstraction layer may then identify the second messaging channel from which the message is received. The first abstraction layer may then convert the message from a platform-specific message to a generic message. The first abstraction layer may then send the converted message to the bot engine. In another embodiment, the interception and conversion may be transparent to the bot engine. In this way, the bot engine may start a conversation using a first messaging channel and may continue the conversation utilizing the second messaging channel, utilizing the first abstraction layer.

Furthermore, in one embodiment, the first abstraction layer may identify one or more characteristics of the initial messaging channel, and may pass those characteristics to the bot engine. The bot engine may then analyze the conversation in association with the characteristics of the initial messaging channel, and may determine whether the initial messaging channel is appropriate for the conversation. For example, the bot engine may determine whether a security level associated with the initial messaging channel provides sufficient security for a sensitivity level associated with the conversation. If the bot engine determines that the security level does not provide a sufficient security for the sensitivity level, the bot engine may request that another messaging channel (e.g., a messaging channel having a sufficient security level for the sensitivity level of the conversation) be used for the conversation. The first abstraction layer may then switch to the other messaging channel to continue the conversation.

In this way, a single bot engine may interact with a plurality of different messaging channels and a plurality of different external components, via the abstraction layers. This may reduce and amount of data that needs to be stored for the bot engine within a computing system. For example, only a single generic bot engine instance may need to be stored instead of multiple platform-specific bot engine instances.

Additionally, a performance of a system implementing the bot engine may also be improved. For example, a single bot engine may be elected and used for all implementations, which may reduce an amount of implementation-specific selection logic, which may increase performance.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
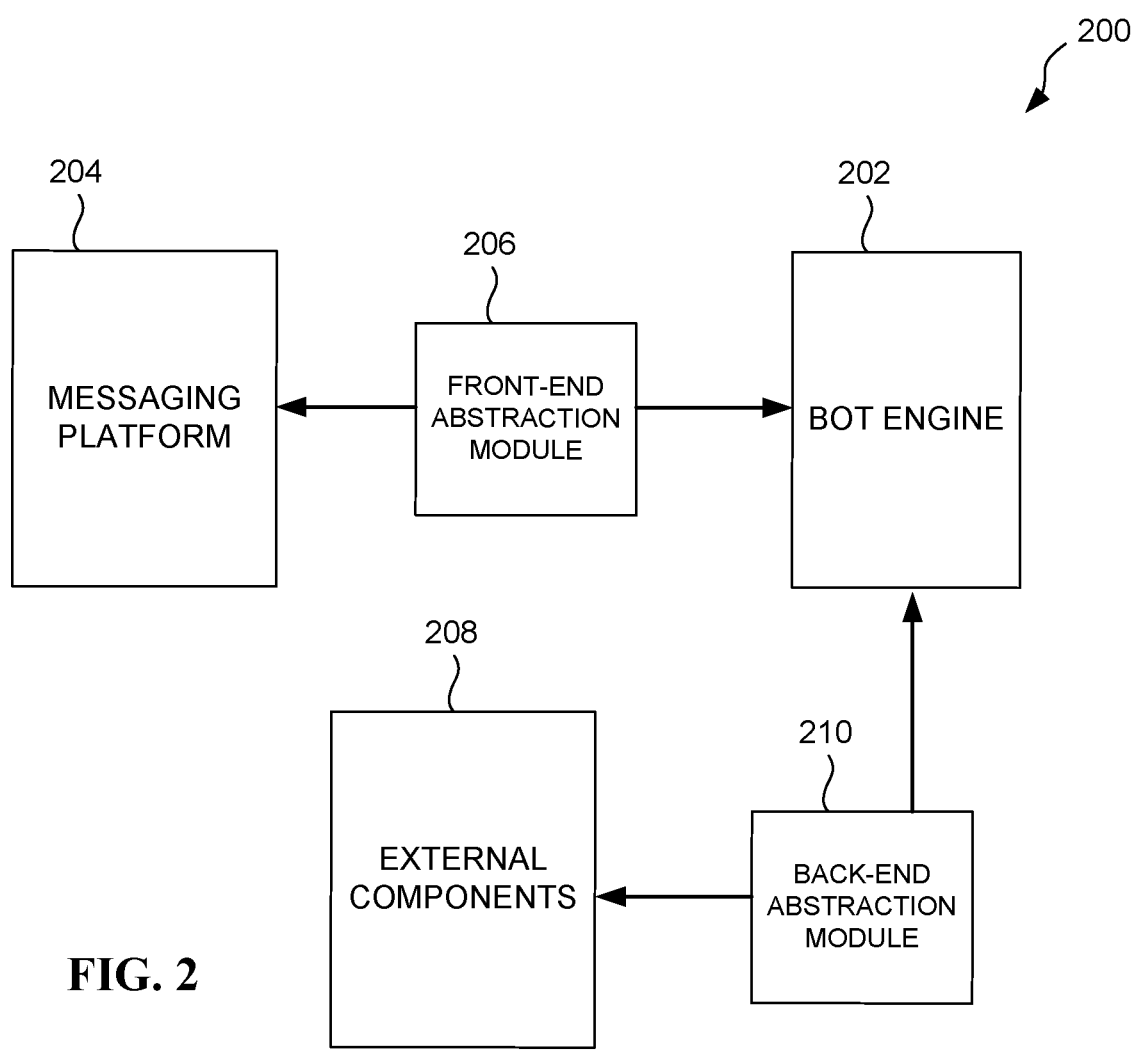
FIG. 2 illustrates an exemplary abstraction environment, in accordance with one embodiment.

FIG. 2 illustrates an exemplary abstraction environment 200, in accordance with one embodiment. As shown in FIG. 2, a bot engine 202 is in communication with a plurality of messaging platforms 204 via a front-end abstraction 206. Additionally, the bot engine 202 is in communication with a plurality of external components 208 via a back-end abstraction 210.

In one embodiment, the bot engine 202 may include an application that is capable of conducting a conversation with one or more users (e.g., customers, etc.). For example, the bot engine 202 may implement a chat bot that receives and respond to one or more messages from the plurality of messaging platforms 204. In another embodiment, each of the plurality of messaging platforms may include an application that may be used by a user (e.g., a customer, etc.) to send a message to the bot engine 202.

For example, each of the plurality of messaging platforms may include a web-based or standalone application that presents a user with a dialog box. The user may use the dialog box to enter one or more of text, audio, video, etc. Upon selection of an icon within the dialog box, the messaging platform may send the data entered into the dialog box to the bot engine 202.

Further, in one embodiment, the front-end abstraction module 206 may intercept and convert messages sent from the plurality of messaging platforms 204 to the bot engine 202. For example, one of the plurality of messaging platforms 204 may send a platform-specific message to the bot engine 202. This message may be intercepted by the front-end abstraction module 206, and may be analyzed by the front-end abstraction module 206 to determine one or more message characteristics (e.g., a sender of the message, a messaging platform used to send the message, etc.).

Additionally, in another example, the front-end abstraction module 206 may convert the platform-specific message to a generic message (e.g., a plain string format message, etc.), utilizing the one or more message characteristics. For example, the front-end abstraction module 206 may determine that the platform-specific message was sent by a specific messaging platform, and may use one or more conversion techniques associated with that specific messaging platform to convert the platform-specific message to a generic message format. The message may then be sent from the front-end abstraction module 206 to the bot engine 202 in the generic message format. The message may also include the one or more message characteristics (e.g., as metadata, etc.).

Further, in one embodiment, upon receiving the message in the generic message format, the bot engine 202 may send one or more requests to one or more of the external components 208. For example, the bot engine may send a request for an analysis of the message to one or more of the external components 208. In another embodiment, the external components 208 that are chosen by the bot engine 202 may be determined based on the one or more message characteristics. For example, a subset of the one or more of the external components 208 may be associated with a user identified by the one or more message characteristics, and the bot engine 202 may be limited to sending requests to that subset.

Further still, in one embodiment, a request sent from the bot engine 202 to one of the external components 208 may be in a generic request format. For example, a specific external component 208 may not be specified in the generic request format. In another embodiment, the back-end abstraction module 210 may intercept the request in the generic request format. In yet another embodiment, the back-end abstraction module 210 may determine a specific external component 208 to receive the request and may convert the request to a component-specific format associated with the specific component 208.

For example, the back-end abstraction module 210 may analyze information associated with the request (e.g., metadata, etc.) to determine a specific external component 208 that is to receive the request. The back-end abstraction module 210 may then identify a format used by the specific external component 208, and may convert the request from the generic request format to the component-specific format. The back-end abstraction module 210 may then forward the request to the specific external component 208 in the component-specific format.

Also, in one embodiment, response information in a component-specific format may be sent from the specific external component 208 to the bot engine 202 in response to the request. The back-end abstraction module 210 may intercept this response information, convert the response information from the component-specific format to a generic format, and forward the response information in the generic format to the bot engine 202.

In addition, in one embodiment, the back-end abstraction module 210 may determine which of the external components 208 to use to assist the bot engine 202. For example, if a plurality of the external components 208 perform similar functionality, the back-end abstraction module 210 may select one of the external components 208 to implement such functionality for the bot engine 202.

Furthermore, after receiving the response information in the generic format, the bot engine 202 may send a message response to the messaging platform 204 that sent the initial message in a generic format. The front-end abstraction module 206 may intercept the message response, convert the message response from the generic format to a platform-specific format matching the specific messaging platform 204, and may forward such message on to the specific messaging platform 204.

In one embodiment, the front-end abstraction module 206 and the back-end abstraction module 210 may be separate modules implemented at separate levels of abstraction, or a single module implemented at a single level of abstraction. The abstraction modules 206 and 210 may include framework components such as a conversation engine, a message converter, a platform connector, a session manager, and/or language middleware.

Additionally, in one embodiment, the abstraction modules 206 and 210 may be associated with a predetermined configuration that may be adjusted. For example, a specific language engine selected by the back-end abstraction module 210 may be switched by adjusting the predetermined configuration.

Further, in one embodiment, the bot engine 202 may be in communication with a session management module that maintains information about a current chat session. For example, the session management module may maintain information in a session store regarding a user that is chatting with the bot engine 202, such that the information is available at any point in time to understand an exact state of the chat session and any required supporting information.

In this way, a level of abstraction may be created for the bot engine 202, such that a single bot engine 202 may receive messages in a generic message format from a variety of different messaging platforms 204, and may utilize the services of a variety of different external components 208.

Figure 3:
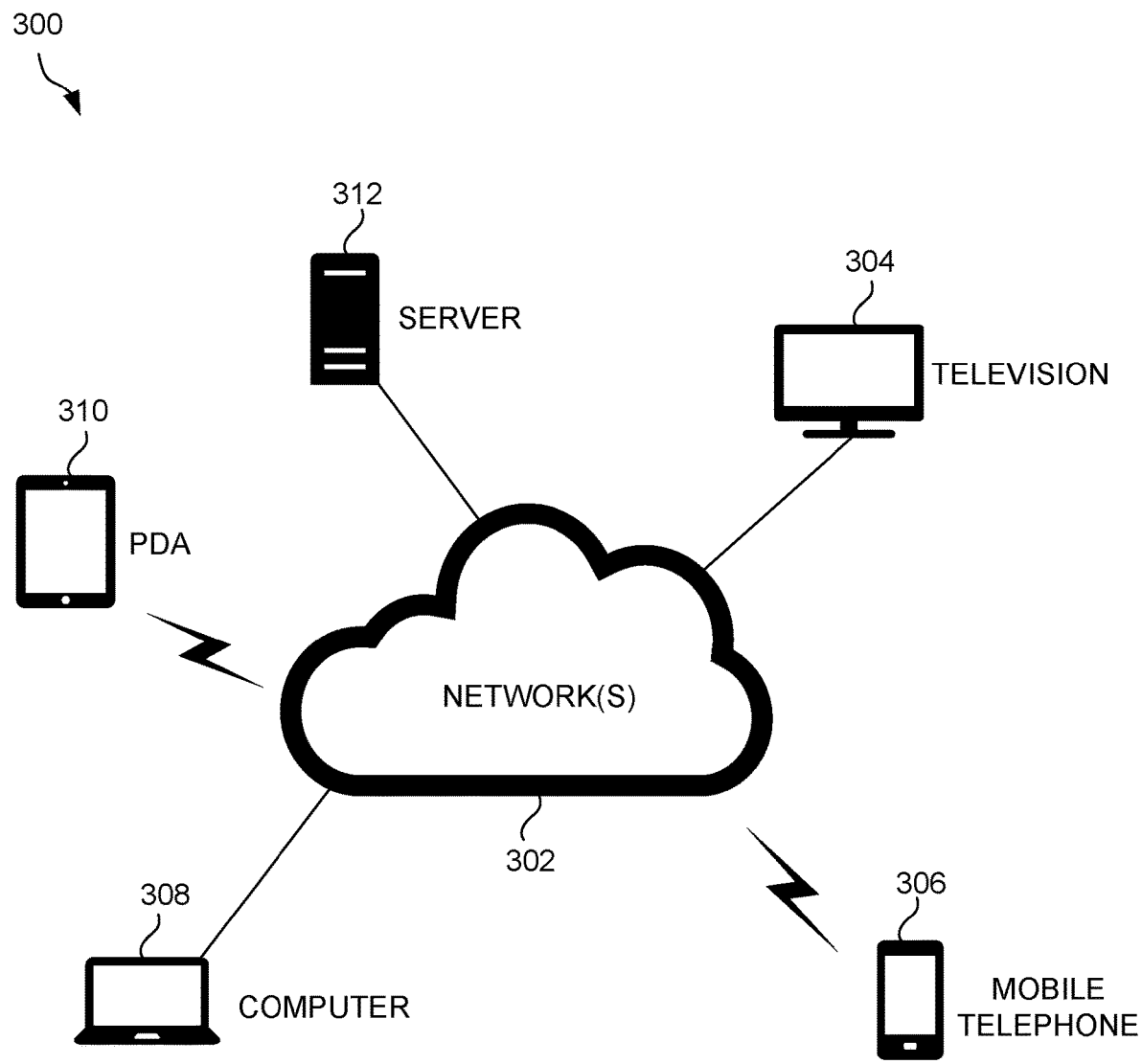
FIG. 3 illustrates a network architecture, in accordance with one possible embodiment.

FIG. 3 illustrates a network architecture 300, in accordance with one possible embodiment. As shown, at least one network 302 is provided. In the context of the present network architecture 300, the network 302 may take any form including, but not limited to a telecommunications network, a local area network (LAN), a wireless network, a wide area network (WAN) such as the Internet, peer-to-peer network, cable network, etc. Additionally, the network 302 may include a public or on-premise cloud. While only one network is shown, it should be understood that two or more similar or different networks 302 may be provided.

Coupled to the network 302 is a plurality of devices. For example, a server computer 312 and an end user computer 308 may be coupled to the network 302 for communication purposes. Such end user computer 308 may include a desktop computer, lap-top computer, and/or any other type of logic. Still yet, various other devices may be coupled to the network 302 including a personal digital assistant (PDA) device 310, a mobile phone device 306, a television 304, etc.

Figure 4:
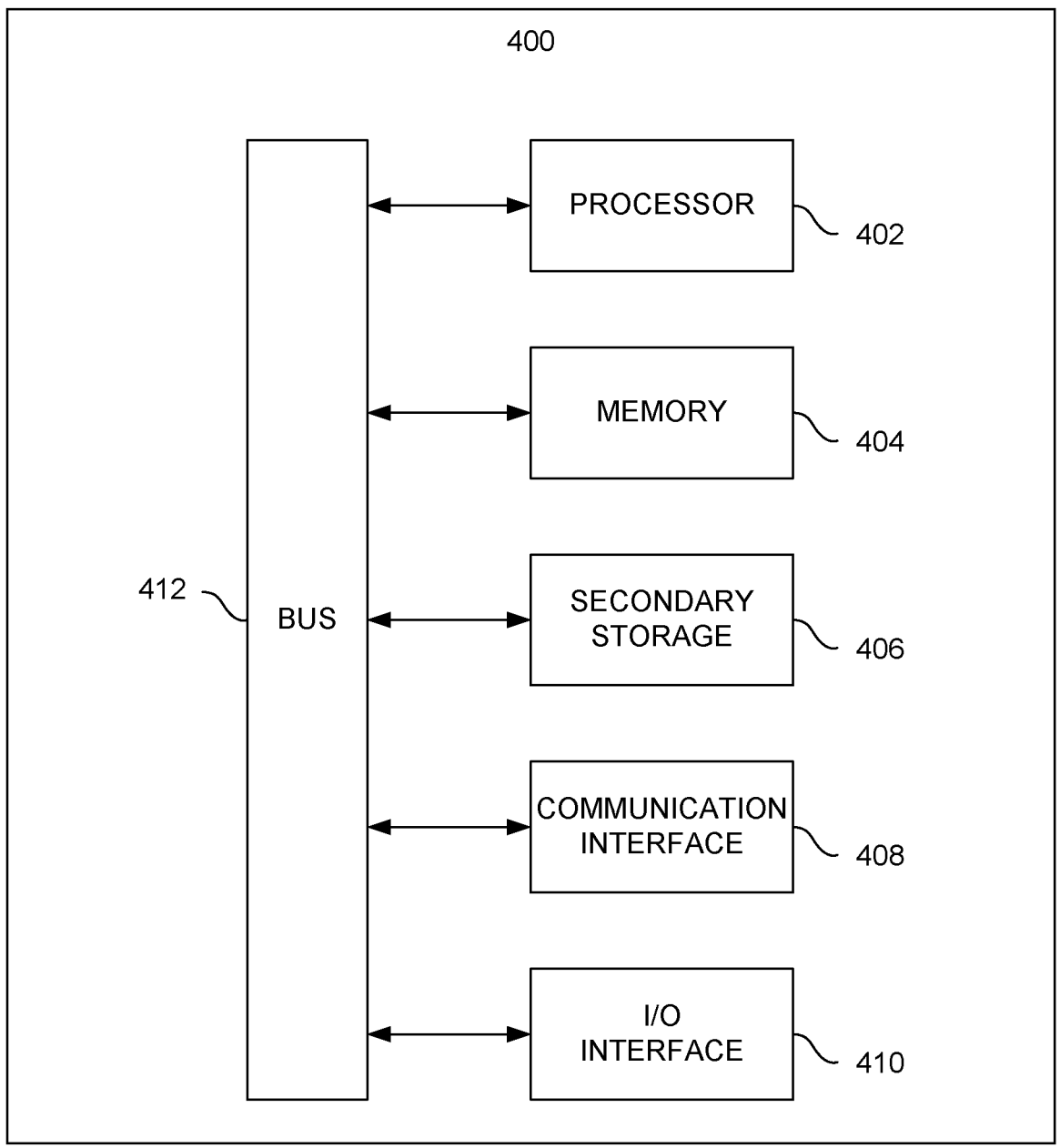
FIG. 4 illustrates an exemplary system, in accordance with one embodiment.

FIG. 4 illustrates an exemplary system 400, in accordance with one embodiment. As an option, the system 400 may be implemented in the context of any of the devices of the network architecture 300 of FIG. 3. Of course, the system 400 may be implemented in any desired environment.

As shown, a system 400 is provided including at least one central processor 402 which is connected to a communication bus 412. The system 400 also includes main memory 404 [e.g. random access memory (RAM), etc.]. The system 400 also includes a graphics processor 408 and a display 410.

The system 400 may also include a secondary storage 406. The secondary storage 406 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404, the secondary storage 406, and/or any other memory, for that matter. Such computer programs, when executed, enable the system 400 to perform various functions (as set forth above, for example). Memory 404, storage 406 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A computer implemented method, comprising:
   receiving a message at a bot engine from a messaging channel, utilizing a first abstraction layer, wherein the first abstraction layer:
   intercepts the message before it is received at the bot engine,
   identifies the messaging channel from which the message is received,
   converts the message from a platform-specific message to a generic message, and sends a converted message to the bot engine,
   wherein the interception and conversion are transparent to the bot engine;
   accessing one or more external components by the bot engine, utilizing a second abstraction layer, to create a response to the message; and
   sending the response from the bot engine to the messaging channel, utilizing the first abstraction layer.

2. The computer implemented method of claim 1, wherein the message has one or more associated characteristics, including one or more of a user ID of a customer sending the message, an ID of the messaging channel that sent the message, a location of a user, and a time and date that the message was sent.

3. The computer implemented method of claim 1, wherein the messaging channel includes one or more of a social media website, a social media application, a communications website, and a communications application.

4. The computer implemented method of claim 1, wherein the message is sent to the bot engine in response to an insertion of text or other media into a provided chat window by a customer, and a selection by a customer of a send option.

5. The computer implemented method of claim 1, wherein the external components include one or more language understanding services, including an artificial intelligence (AI) engine that analyzes the message to determine and return one or more of a sentiment, a personality, a language, and an intent of a customer sending the message.

6. The computer implemented method of claim 1, wherein the external components include one or more translation services, including an engine that translates text or audio of the message to a different language that is then returned to the bot engine.

7. The computer implemented method of claim 1, wherein the external components include one or more analytics services, including an analytics engine that compares one or more portions of the message to historical data in order to determine how to create the response to the message to create optimal results, where the determination is then returned to the bot engine.

8. The computer implemented method of claim 1, wherein the external components include one or more business services components, including a business services engine that accesses one or more business microservices in order to determine how to create the response to the message according to one or more predetermined business plans, where the determination is then returned to the bot engine.

9. The computer implemented method of claim 8, wherein the one or more business services components may also include business process automation that performs one or more actions automatically in response to being triggered by receiving predetermined message data.

10. The computer implemented method of claim 1, wherein the external components include one or more chat storage components, including a data storage service that stores and aggregates historical messages for analysis.

11. The computer implemented method of claim 1, wherein the external components include one or more conversation flow control services, which modify a flow of conversation of the bot engine.

12. The computer implemented method of claim 1, wherein creating the response to the message includes analyzing, by the bot engine, the message as well as information received from the one or more external components.

13. The computer implemented method of claim 1, wherein the second abstraction layer utilizes bootstrapping to access the one or more external components.

14. A computer implemented method, comprising:
   receiving a message at a bot engine from a messaging channel, utilizing a first abstraction layer, wherein the first abstraction layer:

intercepts a generic message before it is sent to the messaging channel, identifies the messaging channel for which the message is intended, converts the message from a generic message to a platform-specific message, based on the messaging channel for which the message is intended; and sends a converted message to the intended messaging channel;

accessing one or more external components by the bot engine, utilizing a second abstraction layer, to create a response to the message; and sending the response from the bot engine to the messaging channel, utilizing the first abstraction layer.

15. The computer implemented method of claim 1, further comprising receiving a second message at the bot engine from a second messaging channel that is different from the messaging channel, utilizing the first abstraction layer, where the first abstraction layer:

intercepts the second message before it is received at the bot engine;

identifies the second messaging channel from which the second message is received;

converts the second message from a second platform-specific message to a second generic message; and sends a second converted message to the bot engine;

wherein the interception and conversion are transparent to the bot engine.

16. The computer implemented method of claim 1, wherein the first abstraction layer identifies one or more characteristics of the messaging channel, and passes those characteristics to the bot engine.

17. The computer implemented method of claim 16, wherein the bot engine analyzes a conversation in association with the one or more characteristics of the messaging channel, and determines whether the messaging channel is appropriate for the conversation.

18. A computer program product comprising computer executable instructions stored on a non-transitory computer readable medium that when executed by a processor instruct the processor to:

receive a message at a bot engine from a messaging channel, utilizing a first abstraction layer, wherein the first abstraction layer:

intercepts the message before it is received at the bot engine, identifies the messaging channel from which the message is received, converts the message from a platform-specific message to a generic message, and sends a converted message to the bot engine, wherein the interception and conversion are transparent to the bot engine;

access one or more external components by the bot engine, utilizing a second abstraction layer, to create a response to the message; and send the response from the bot engine to the messaging channel, utilizing the first abstraction layer.

19. A device, comprising:

a non-transitory memory storing instructions; and one or more processors in communication with the non-transitory memory, wherein the one or more processors execute the instructions to:

receive a message at a bot engine from a messaging channel, utilizing a first abstraction layer, wherein the first abstraction layer:

intercepts the message before it is received at the bot engine, identifies the messaging channel from which the message is received, converts the message from a platform-specific message to a generic message, and sends a converted message to the bot engine, wherein the interception and conversion are transparent to the bot engine;

access one or more external components by the bot engine, utilizing a second abstraction layer, to create a response to the message; and send the response from the bot engine to the messaging channel, utilizing the first abstraction layer.

\* \* \* \* \*